United States Patent [19]

Frezzolini et al.

[11] 3,946,260
[45] Mar. 23, 1976

[54] MOTOR CONSTRUCTION
[75] Inventors: James Frezzolini; James J. Crawford, both of Ringwood, N.J.
[73] Assignee: Frezzolini Electronics, Inc., Hawthorne, N.J.
[22] Filed: Aug. 19, 1974
[21] Appl. No.: 498,463

[52] U.S. Cl. .................... 310/112; 310/89; 310/154
[51] Int. Cl.² ............................................. H02K 5/04
[58] Field of Search .................... 318/245, 440, 441; 310/112, 114, 126, 152, 156, 154, 89, 40 MM

[56] References Cited
UNITED STATES PATENTS

| | | | |
|---|---|---|---|
| 1,102,116 | 6/1914 | Wood | 310/112 Y |
| 3,165,654 | 1/1965 | Mabuchi | 310/46 |
| 3,601,678 | 8/1971 | Abraham et al. | 318/254 X |

*Primary Examiner*—Donovan F. Duggan
*Attorney, Agent, or Firm*—Ryder, McAulay, Fields, Fisher & Goldstein

[57] ABSTRACT

A compact AC-DC motor comprising a housing having a center section and respective end bells, each having a recess therein. A stator is received in the housing and extends into the recess in one end bell and a magnetic pole piece is similarly received in the housing and extends into the recess in the other end bell. Rotatably supported in the end bells is a shaft which mounts a rotor which cooperates with the stator, and an armature winding in juxtaposition to the rotor which cooperates with the pole piece. Additionally, a brush holder is affixed to the end of the pole piece whereby the construction provides a highly efficient motor which occupies a minimum volume of space.

4 Claims, 4 Drawing Figures

MOTOR CONSTRUCTION

The present invention relates to a motor construction and, more particularly, pertains to an AC-DC motor construction which occupies a minimum volume.

In many applications it is highly desirable to utilize a motor which may be operated from either an AC or a DC source of power, which is highly efficient, and which is relatively small in size. For example, motor-driven cameras, particularly hand-held cameras such as the type utilized by television cameramen, require such an AC and a DC motor contained within a single housing. That is, when used in the field such cameras are usually powered by a DC battery pack and operated at a constant speed via a phase lock loop control circuit. However, when utilized in the studio, the cameras may be powered by an AC source via a line cord which connects the camera with a conventional outlet and operated synchronously. It is obvious that in such situations the space occupied by such motors is of primary consideration since the cameraman is required to carry and maintain such cameras steady when they are "shooting." However, heretofore, motors of the type under consideration occupied considerable space and, as a result, such cameras were bulky and unwieldy to maneuver.

In addition, many cameras presently in use use only DC motors. However, in order to increase their versatility these cameras are being reconditioned to operate from both AC and DC sources. Since the size of the motor compartment is already fixed by the present design of the camera, it is necessary to fit the AC-DC motor into the same volume without any sacrifice of either efficiency or accuracy.

Accordingly, an object of this invention is to provide an improved AC-DC motor construction.

A more specific object of the present invention is to provide an AC-DC motor which is highly compact and therefore occupies a minimum volume.

A further object of the present invention resides in the novel details of construction which provide an AC-DC motor of the type described which is highly efficient in operation while, at the same time, achieving an economy of space.

Accordingly, an AC-DC motor constructed according to the present invention comprises a housing which includes a center section having respective open ends. The open ends of the center section are closed by respective first and second end bells each having a recess therein. A shaft extends through the housing and is rotatably supported by the end bells. A rotor is fixedly mounted on the shaft and a stator is received in the housing and is positioned in surrounding relationship to the rotor and extends into the recess in the first end bell. An armature winding is similarly fixedly mounted on the shaft adjacent the rotor. Magnetic poles are received in the center section in electromagnetic cooperation with the armature winding. A plurality of commutator segments are received on the shaft and are connected to the armature winding. Brush means is provided in the housing in electrical engagement with the commutator segments and a plurality of leads respectively connect to the brush means and the stator thereby providing a highly compact and efficient AC-DC motor construction.

Other features and advantages of the present invention will become more apparent from a consideration of the following detailed description when taken in conjunction with the accompanying drawing, in which.

Figure 1:
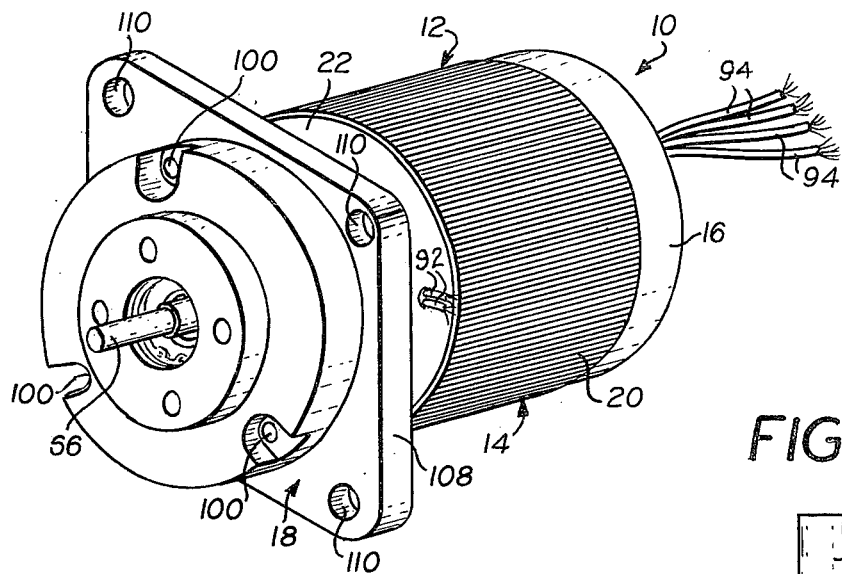
FIG. 1 is a perspective view of an AC-DC motor constructed according to the present invention.

Accordingly, the AC-DC compact motor construction of the present invention is designated generally by the reference numeral 10 in the figures and includes a housing designated generally by the reference numeral 12. The housing 12 includes a center section 14 and respective end bells 16 and 18.

Figure 2:
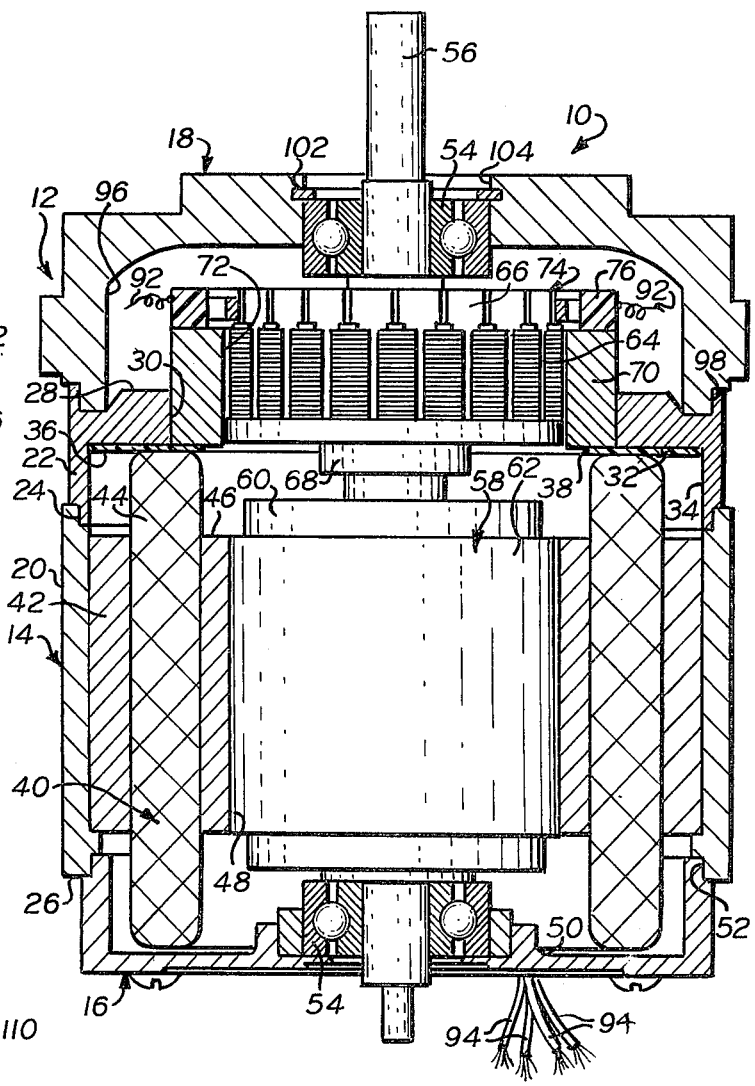
FIG. 2 is a horizontal sectional view thereof, to an enlarged scale.

More particularly, the center section 14 comprises a cylindrical member 20 and a cylindrical member 22 which may be affixed to the member 20 by a press fit or the like. A circumferential rabbet joint 24 is provided between the members 20 and 22. As shown in FIG. 2, the end bell 16 closes the open end 26 of the center section 14 and the end bell 18 closes the open end 28 of the section 14.

Provided within the member 22 is a reduced diameter portion 30 which forms a circumferential seat 32 with the enlarged diameter portion 34 of the center section 14. A circular insulating washer 36 having a central aperture 38 abuts the seat 32.

Received within the enlarged diameter portion 34 of the section 14 is a stator designated generally by the reference numeral 40. The stator is cylindrical in cross section and includes an outer insulating covering 42, a stator winding 44, and an inner insulating covering 46 which defines a central through bore 48. As shown in FIG. 2, the stator winding 44 extends beyond the ends of the coverings 42 and 46 and one end abuts the insulating washer 36. The other end of the stator winding 44 extends beyond the open end 26 of the section 14. However, as shown in FIG. 2, the end bell 16 is provided with an annular recess 50 which receives the end of the stator winding 44 therein. The end bell 16 and the open end 26 of the section 14 are provided with a circumferential rabbet joint 52 so that the end bell 16 seats on the section 14. Additionally, the end bell 16 may be affixed to the section 14 in any conventional manner as by a press fit or by screws extending through the end bell 16 into the wall of the section 14.

Centrally located in the end bells 16 and 18 are bearings 54 which rotatably support an axial shaft 56. Fixedly mounted on the shaft 56, by a press fit or the like, is a rotor, designated generally by the reference numeral 58. As shown in FIG. 2, the rotor 58 is received within the bore 48 and is surrounded by the stator winding 44. The rotor may comprise a balanced aluminum core 60 which is surrounded by a polished alnico jacket 62. The stator 40 and the rotor 58 may comprise an AC hysteresis synchronous motor of the type manufactured by the Electric Indicator Company, Inc. of Wilton, Connecticut and designated Model No. BSHJ-2626410. Conventionally, this type of motor is a two-phase motor wherein the difference in phases is obtained by placing a capacitor in series with one of the phases of the winding.

Also received on the shaft 56 and fixedly mounted thereon by a press fit or the like is an armature winding 64 of a torquer DC motor. The armature winding 64 is connected to commutator segments 66 also mounted on the shaft 56, in the conventional manner. The armature winding 64 is separated from the rotor 58 by a bushing 68 which is similarly mounted on the shaft 56.

A cylindrical magnet 70 having a central aperture 72 is slidingly received within the reduced diameter portion 30 of the member 22. Additionally, the armature winding 64 is received within the central aperture 72 of the magnetic 70. The magnet 70 electromagnetically cooperates with the armature winding 64 and is effectively the magnetic pole piece for the armature winding. As shown in FIG. 2, the magnet 70 abuts the insulating washer 36. A brush arrangement designated generally by the reference numeral 74 introduces power to the armature winding 64 via the commutator segments 66.

Figure 3:
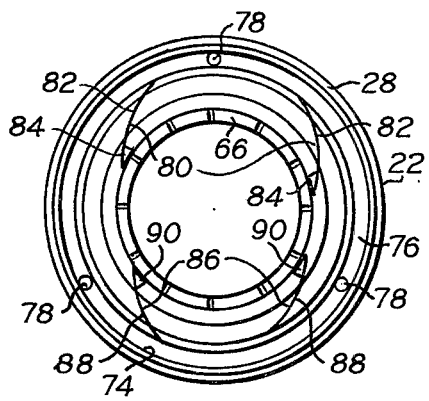
FIG. 3 is an end view of the motor shown in FIG. 1 with the end bell removed to illustrate the brush mounting arrangement of the motor of the present invention.

More specifically, as shown in FIGS. 2 and 3, the brush arrangement 74 includes an insulating ring 76 fabricated from plastic or the like. The ring 76 is affixed to the edge of the magnet 70 by screws 78. As shown in FIG. 2, the outer diameter of the ring 76 is equal to the outer diameter of the magnet 70. Connected to and depending from the inner wall of the ring 78 is a brush set 80. The brush set 80 includes leaf springs 82 of an electrically conducting material and silver graphite brushes 84 which are adapted to engage the commutator segments 66 in the conventional manner. In a similar manner, a lower brush set 86 is provided which includes leaf springs 88 electrically connected to carbon brushes 90 which similarly engage the commutator segments 66. The brush sets 80 and 86 may be connected to an external source of power or to a load via leads 92 which extend through the end bell 16. Additionally, leads 94 which also extend through the end bell 16 are provided to connect an AC source of power to the stator winding 44.

Figure 4:
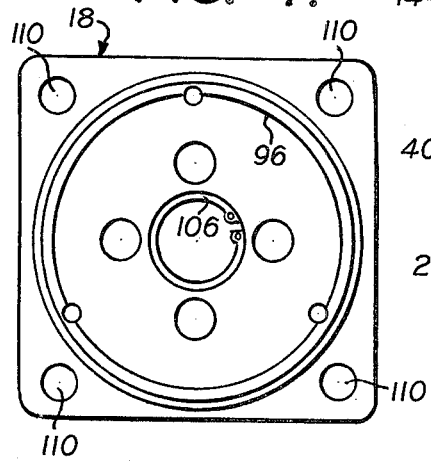
FIG. 4 is a rear view of the lefthand end bell shown in FIG. 1.

As shown in FIG. 2, a portion of the magnet 70, a portion of the armature winding 64 and the commutator segments 66 extend beyond the open end 28 of the center section 14. However, the end bell 18 is provided with a recess 96 which encloses the portions of the DC motor extending beyond the end of the center section. Additionally, the end 28 of the section 14 and the inner end of the end bell 18 are provided with a circumferential rabbet joint 98 to provided a seal between the end bell and the center section. The end bell 18 may be connected to the center section 14 by a press fit or by screws 100 which extend through the end bell and into the center section 14. Additionally, as shown in FIG. 4, the end bell 18 is provided with a groove 102 in an aperture 104, which receives the bearing 54 therein. The groove receives a spring retainer 106 against which the bearing 54 seats when the unit is assembled.

The end bell 18 includes a rectangular portion 108 which extends beyond the outer diameter of the center section 14 and is provided with apertures 110 at the corners thereof so that the motor construction 10 may be connected to an external load device by connecting means such as screws which extend through the apertures 110.

Thus, by providing the recessed end bells and the compact brush arrangement an extremely compact and efficient AC-DC motor construction may be provided.

While a preferred embodiment of the invention has been shown and described herein, it will be obvious that numerous omissions, changes and additions may be made in such embodiment without departing from the spirit and scope of the present invention.

What is claimed is:

1. In combination, an AC and a separate DC motor comprising a single housing including a wide center section having respective open ends, a first end bell closing one of said open ends of said center section, a second end bell closing the other of said open ends of said center section, respective recesses in said first and second end bells, a single integral rigid shaft extending through said housing and being rotatably supported in said end bells; said AC motor comprising a rotor fixedly mounted on said shaft, and a stator in said housing surrounding said rotor and positioned to extend into the recess in said first end bell; said DC motor comprising an armature winding fixedly mounted on said shaft adjacent said rotor, magnetic poles in said center section in electromagnetic cooperation with said armature winding, a plurality of commutator segments on said shaft connected to said armature winding, brush means in said housing in electrical engagement with said commutator segments, and a plurality of leads respectively connected to said brush means and said stator and extending through said housing to provide for the connection of an energy source thereto, said magnetic poles comprising a cylindrical magnet coaxially supported in said housing, said armature winding being in juxtaposition to said rotor and being sized and positioned to extend into the recess in said second end bell, said center section comprising a cylinder having an enlarged diameter portion which receives said stator therein, and a reduced diameter portion which receives said magnetic poles therein in sliding engagement with the walls defining said reduced diameter portion, said magnetic poles being sized to extend beyond the end of said reduced diameter portion of said center section and into said recess of said second end bell.

2. The combination of claim 1, in which said brush means comprises an insulating ring connected to the end of said cylindrical magnet and positioned to surround said plurality of commutator segments, and a plurality of brushes supported by said insulating ring and positioned to engage said plurality of commutator segments.

3. The combination of claim 1, in which said rotor comprises an aluminum core and a polished metal jacket on said aluminum core fabricated from alnico.

4. The combination of claim 2, in which said plurality of brushes comprise leaf springs which extend inwardly from said insulating ring.

* * * * *